United States Patent
Eilertsen (10) Patent No.: US 8,098,483 B2
(45) Date of Patent: *Jan. 17, 2012

(54) MULTI ELECTRODE SERIES CONNECTED ARRANGEMENT SUPERCAPACITOR

(75) Inventor: Thor E. Eilertsen, Oneonta, NY (US)

(73) Assignee: Ioxus, Inc., Oneonta, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/911,115

(22) Filed: Oct. 25, 2010

(65) Prior Publication Data

US 2011/0032661 A1 Feb. 10, 2011

Related U.S. Application Data

(63) Continuation of application No. 11/903,929, filed on Sep. 25, 2007, now Pat. No. 7,830,646.

(51) Int. Cl.
*H01G 9/00* (2006.01)

(52) U.S. Cl. ........ 361/502; 361/503; 361/504; 361/512; 361/516; 361/523

(58) Field of Classification Search .......... 361/502, 361/503–504, 509–512, 516–519, 523–529
See application file for complete search history.

(56) References Cited

U.S. PATENT DOCUMENTS

| | | | |
|---|---|---|---|
| 3,819,340 A | 6/1974 | Heier et al. | |
| 4,383,897 A | 5/1983 | Gillich et al. | |
| 4,683,516 A | 7/1987 | Miller | |
| 5,093,762 A | 3/1992 | Sato et al. | |
| 5,126,017 A | 6/1992 | Nakama et al. | |
| 5,150,283 A | 9/1992 | Yoshida et al. | |
| 5,260,855 A | 11/1993 | Kaschmitter et al. | |
| 5,296,125 A | 3/1994 | Glass et al. | |
| 5,393,619 A | 2/1995 | Mayer et al. | |
| 5,618,318 A | 4/1997 | Reddy et al. | |
| 5,621,602 A | 4/1997 | Winkelmann | |
| 5,667,909 A | 9/1997 | Rodriguez et al. | |
| 5,723,231 A | 3/1998 | Wu et al. | |
| 5,729,427 A | 3/1998 | Li et al. | |
| 5,776,628 A | 7/1998 | Kraft et al. | |
| 5,850,331 A | 12/1998 | Matsumoto et al. | |

(Continued)

FOREIGN PATENT DOCUMENTS

JP 1-253910 10/1989

(Continued)

OTHER PUBLICATIONS

Ioxus, Inc. Chinese Patent Appln. Serial No. 200880115065.3. Office action mailed May 31, 2011.

(Continued)

*Primary Examiner* — Nguyen T Ha
(74) *Attorney, Agent, or Firm* — Cooley LLP (57) ABSTRACT

The present invention is an electrochemical double layer capacitor (EDLC) series stack formed into a single electrolyte cell structure. The concatenated multiple electrode assembly stack has electrode assemblies electrically connected in series. The electrode assemblies have a double-sided activated carbon electrode formed on a current collector. Power tabs are connected to the end electrode assemblies. An electrolyte is also provided. A poly bag contains the electrolyte and the electrode assemblies. The electrode assemblies form a double-sided activated-carbon electrode on a current collector. The EDLC stack has a number of segments and mass free zones separating them. The segments are folded so that mass free zones are disposed at the apex of each fold.

20 Claims, 6 Drawing Sheets

U.S. PATENT DOCUMENTS

| | | | |
|---|---|---|---|
| 5,862,035 A | 1/1999 | Farahmandi et al. | |
| 5,907,472 A * | 5/1999 | Farahmandi et al. | 361/502 |
| 5,968,210 A | 10/1999 | Strange et al. | |
| 6,021,040 A * | 2/2000 | Suzuki et al. | 361/514 |
| 6,038,123 A | 3/2000 | Shimodaira et al. | |
| 6,045,942 A | 4/2000 | Miekka et al. | |
| 6,045,943 A | 4/2000 | Nowaczyk | |
| 6,059,847 A | 5/2000 | Farahmandi et al. | |
| 6,084,766 A | 7/2000 | Jerabek et al. | |
| 6,094,788 A | 8/2000 | Farahmandi et al. | |
| 6,099,600 A | 8/2000 | Yan et al. | |
| 6,201,686 B1 | 3/2001 | Hiratsuka et al. | |
| 6,212,059 B1 | 4/2001 | Uchikawa et al. | |
| 6,233,135 B1 | 5/2001 | Farahmandi et al. | |
| 6,246,569 B1 | 6/2001 | Strange et al. | |
| 6,275,371 B1 * | 8/2001 | Yoshio et al. | 361/502 |
| 6,320,740 B1 | 11/2001 | Saito et al. | |
| 6,376,123 B1 | 4/2002 | Chu | |
| 6,379,402 B1 | 4/2002 | Suhara et al. | |
| 6,379,835 B1 | 4/2002 | Kucherovsky et al. | |
| 6,426,863 B1 | 7/2002 | Munshi | |
| 6,430,031 B1 | 8/2002 | Dispennette et al. | |
| 6,451,073 B1 | 9/2002 | Farahmandi et al. | |
| 6,456,484 B1 | 9/2002 | Matsuoka et al. | |
| 6,493,209 B1 | 12/2002 | Kamath et al. | |
| 6,515,845 B1 | 2/2003 | Oh et al. | |
| 6,594,139 B2 | 7/2003 | Muffoletto et al. | |
| 6,614,647 B2 | 9/2003 | Kamath | |
| 6,616,875 B2 | 9/2003 | Lee et al. | |
| 6,631,074 B2 * | 10/2003 | Bendale et al. | 361/509 |
| 6,714,402 B2 | 3/2004 | Kamath | |
| 6,721,168 B2 | 4/2004 | Takeuchi et al. | |
| 6,758,868 B2 | 7/2004 | Munshi | |
| 6,762,926 B1 | 7/2004 | Shiue et al. | |
| 6,793,692 B2 | 9/2004 | Sato et al. | |
| 6,967,183 B2 | 11/2005 | Hampden-Smith et al. | |
| 6,985,352 B2 | 1/2006 | Norton | |
| 7,035,048 B2 | 4/2006 | Hiraguchi | |
| 7,087,348 B2 | 8/2006 | Holman et al. | |
| 7,092,239 B2 * | 8/2006 | Nakazawa et al. | 361/502 |
| 7,173,808 B2 | 2/2007 | Hirata et al. | |
| 7,180,725 B2 | 2/2007 | Takeuchi et al. | |
| 7,198,654 B1 | 4/2007 | Kim et al. | |
| 7,211,345 B2 | 5/2007 | Hampden-Smith et al. | |
| 7,273,597 B2 | 9/2007 | Takeuchi et al. | |
| 7,382,600 B2 | 6/2008 | Paul et al. | |
| 7,394,648 B2 | 7/2008 | Kondo et al. | |
| 7,400,490 B2 | 7/2008 | Gunderman et al. | |
| 7,440,257 B2 * | 10/2008 | Kirchner et al. | 361/502 |
| 7,541,782 B2 | 6/2009 | Narendra et al. | |
| 7,830,646 B2 * | 11/2010 | Eilertsen | 361/502 |
| 2003/0049538 A1 | 3/2003 | Buerger et al. | |
| 2003/0172509 A1 | 9/2003 | Maletin et al. | |
| 2003/0192170 A1 | 10/2003 | Jan et al. | |
| 2004/0062989 A1 | 4/2004 | Ueno et al. | |
| 2004/0085710 A1 | 5/2004 | Takeuchi et al. | |
| 2004/0152832 A1 | 8/2004 | Kirchmeyer et al. | |
| 2005/0231893 A1 | 10/2005 | Harvey | |
| 2006/0115717 A1 | 6/2006 | Schubert et al. | |
| 2006/0130300 A1 | 6/2006 | Kobayashi et al. | |
| 2006/0164790 A1 | 7/2006 | Takeuchi et al. | |
| 2006/0222952 A1 | 10/2006 | Kono et al. | |
| 2006/0274475 A1 | 12/2006 | Chiba | |
| 2007/0001651 A1 | 1/2007 | Harvey | |
| 2007/0015061 A1 | 1/2007 | Klaassen | |
| 2007/0022590 A1 | 2/2007 | Hirano et al. | |
| 2007/0076349 A1 | 4/2007 | Dementiev et al. | |
| 2007/0111093 A1 | 5/2007 | Kashiwagi et al. | |
| 2007/0218365 A1 | 9/2007 | Takezawa et al. | |
| 2007/0223178 A1 | 9/2007 | Fujino | |
| 2007/0224516 A1 | 9/2007 | Deguchi et al. | |
| 2007/0254221 A1 | 11/2007 | Lee et al. | |
| 2008/0003166 A1 | 1/2008 | Maletin et al. | |
| 2008/0013253 A1 | 1/2008 | Thrap et al. | |
| 2008/0013254 A1 | 1/2008 | Miller | |
| 2008/0028583 A1 | 2/2008 | Shimoyama et al. | |
| 2008/0044727 A1 | 2/2008 | Suzuki et al. | |
| 2008/0063931 A1 | 3/2008 | Zucker | |
| 2008/0089011 A1 | 4/2008 | Tasei et al. | |
| 2008/0111110 A1 | 5/2008 | Ma et al. | |
| 2008/0266754 A1 | 10/2008 | Kazaryan et al. | |
| 2009/0109600 A1 | 4/2009 | Reddy et al. | |
| 2009/0141422 A1 | 6/2009 | Bourcier | |
| 2009/0279230 A1 | 11/2009 | Eilertsen et al. | |
| 2010/0053844 A1 | 3/2010 | Eilertsen | |

FOREIGN PATENT DOCUMENTS

| | | |
|---|---|---|
| JP | 1-310523 | 12/1989 |
| JP | 3-101211 | 4/1991 |
| JP | 7-201675 | 8/1995 |
| JP | 7-240347 | 9/1995 |
| JP | 1-326145 | 11/2001 |
| JP | 6-121000 | 5/2006 |
| WO | WO 99/24995 | 5/1999 |

OTHER PUBLICATIONS

International Search Report and Written Opinion for International Application No. PCT/US2008/077460, mailed on Feb. 27, 2009.
Office Action for U.S. Appl. No. 11/903,929, mailed on Jan. 7, 2010.
International Search Report and Written Opinion for International Application No. PCT/US2009/043259, mailed on Dec. 18, 2009.
Office Action for U.S. App. No. 12/006,476, mailed on Nov. 18, 2009.
International Preliminary Report on Patentability for International Application No. PCT/US2008/077460, issued on Mar. 30, 2010.
International Search Report and Written Opinion for International Application No. PCT/US2009/055299, mailed on Apr. 1, 2010.

* cited by examiner

MULTI ELECTRODE SERIES CONNECTED ARRANGEMENT SUPERCAPACITOR

CROSS-REFERENCE TO RELATED APPLICATIONS

This application is a continuation of U.S. patent application Ser. No. 11/903,929, filed Sep. 25, 2007 entitled "Multi Electrode Series Connected Arrangement Supercapacitor," the disclosure of which is incorporated by reference in its entirety.

FIELD OF THE INVENTION

The invention pertains to electrochemical double layer capacitor devices and, more particularly, to a device fabricated using multiple series connected electrode assemblies within a single cell to form a predetermined voltage standoff.

BACKGROUND OF THE INVENTION

Direct current electronic circuits and devices that are manufactured today have specific voltage requirements for proper operation. Nominal voltages can range from 1.2 volts to hundreds of volts. The power supply, or source, must match the load requirements.

Until recently only chemical batteries with specific voltage windows were suitable for certain applications. The most common battery is the 1.5-volt single cell. In order to obtain larger voltage limits, individual battery cells must be stacked, or concatenated in series, plus to minus to plus to minus etc. Combining individual cells into battery packs has therefore been the conventional solution to overcoming the voltage limitation of single cells. Larger batteries are merely a collection of smaller, in-series, single battery cells placed in one container with single input and output terminals.

Symmetrical, bipolar electrochemical double layer capacitors, or EDLCs, are constructed by alternately layering electrode material and separators, forming the electrode assembly a stacked structure. The electrode material is generally made, starting with capacitor grade aluminum. An activated carbon mixture is deposited or laminated on top and bottom, forming a double-sided electrode. Two of these electrodes are used, one being the positive and the other being the negative side of a simple cell. The separator is used to electrically isolate the two electrodes and also as the conductor for electrically charged protons. Typically, the completed electrode assembly is then placed in a canister with an electrolyte and then sealed becoming a one-cell structure.

Until now, as with chemical batteries, individual EDLC cells must operate within specific voltage ranges dictated by the choice of electrolyte. Electrolytes used today are available in two different forms: aqueous and aprotic. Aqueous electrolytes generally have a working window of 1.0 to 1.2 volts, per cell. Aprotic, or dampened-wetted, electrolytes, however, have a range of 2.2 to 4.6 working volts, per cell. In this disclosure, an Acetonitrile solvent is used with a quanterry salt of 1.0M TEABF4.

It is well known to electrochemists that charged ionic transfer occurs primarily in one region, namely the Helmholtz layer. This layer is only several angstroms thick and is formed between the current collector and activated carbon. It is in this region that charged particles, negative or positive, transfer their charge to the current collector. In a neutral solution state, or a non-charged state, the electrolyte has an evenly distributed zero charge. As the electrode assembly structure gains or loses charge, the movement of charge separates individually to its own polarity terminal. The charge concentration penetrates the activated carbon material composite into the Helmholtz region to varying degrees. The level of electrolyte charge concentration is minimum at the separator and maximum at the Helmholtz region.

SUMMARY OF THE INVENTION

In accordance with the present invention there is provided an electrochemical double layer capacitor (EDLC) single cell, with electrolyte, incorporating series electrode assemblies to provide an increased voltage stack. The series voltage stack has essentially individual electrode assemblies electrically concatenated together in series. The electrodes have a double-sided activated carbon composition formed on a capacitor grade aluminum current collector.

The EDLC stack has a number of segments and mass free zones separating them. The segments are folded so that mass free zones are disposed at the apex of each fold. Power tabs, plus and minus, are connected to the end extensions of the electrode assemblies. Monitor/control tabs are operatively attached and extended from the series connected segments. In one embodiment, a poly bag, as a single cell, contains the electrolyte and the electrode assemblies. Power and monitor/control tabs are operatively extended from the electrode assemblies. The EDLC stack has a number of segments and mass free zones separating them. The segments are folded so that mass free zones are disposed at the apex of each fold.

BRIEF DESCRIPTION OF THE DRAWINGS

Various objects, features, and attendant advantages of the present invention will become more fully appreciated as the same becomes better understood when considered in conjunction with the accompanying drawings, in which like reference characters designate the same or similar parts throughout the several views, and wherein.

DETAILED DESCRIPTION OF THE PREFERRED EMBODIMENT

The invention is a symmetrical bipolar electrochemical double layer capacitor device. A series multiple voltage stack has electrode assemblies electrically connected in series. The electrode assemblies have a double-sided activated carbon electrode formed on a current collector. A poly bag is used to contain the electrolyte and the electrode assemblies.

Two embodiments have been developed for increasing the voltage standoff of a single cell device typically rated at 2.7-volts. Although a 12-volt cell is described herein, it should be understood that any other voltage can be obtained including, but not limited to 12-volt cells.

Figure 1A:
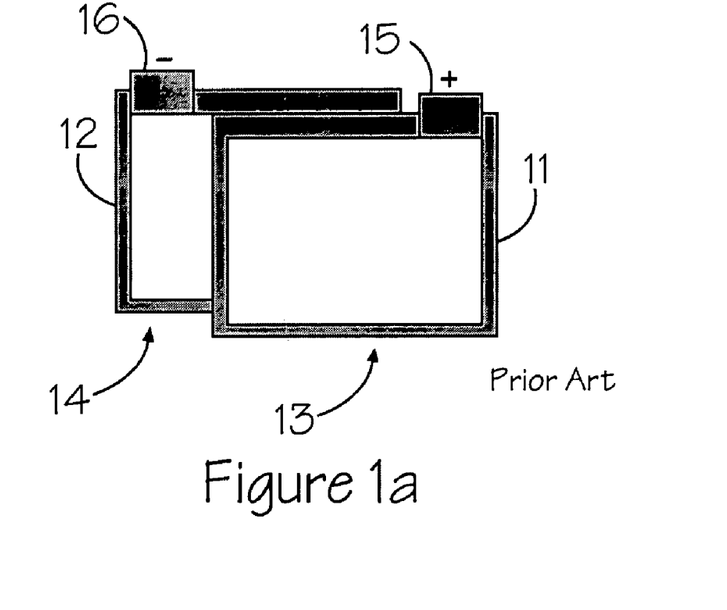
FIG. 1a is a front view of the components of a single EDLC device of the prior art.
Figure 1B:
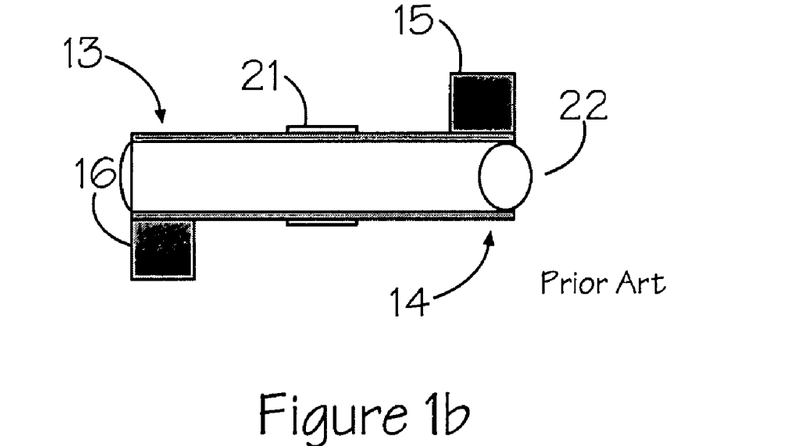
FIG. 1b is a side view of the single EDLC device of FIG. 1a assembled.

Individual EDLC electrodes and required separator 10 is shown in FIG. 1 and the completed assembly 20 in FIG. 1b. A typical electrolyte window of 2.7-volts (1M $TEABF_4$/ACN) of the EDLC electrode assembly 20 is divided into the required voltage needed by the application. The primary consideration is that the electrolyte depends only on the first electrode assembly and its electrolyte voltage window when considering a series string of EDLCs.

Two double sided activated carbon electrodes 11 and 12 are disposed parallel to each other, as shown. Separators 13 and 14 extend between and beneath the two electrodes 11, 12. A negative bare aluminum foil tab 16 and a positive bare aluminum foil tab 15 extend from the respective electrodes 12, 11. Although the electrodes 11, 12 and separators 13, 14 are shown offset from each other in FIG. 1a, this depiction is only illustrative. Electrodes 11, 12 are rolled from bottom to top, leaving terminal tabs 15, 16, respectively, exposed 180° from each other.

Referring now also to FIG. 1b, top view of EDLC electrodes 10 shows negative and positive tabs 16, 15, respectively. Separators 14, 13 electrically isolate electrodes 12, 11. Kapton tape 21 binds the package of electrodes 12, 11 and separators 14, 13, like a sandwich. The amount of activated carbon and composite material used in fabricating the single EDLC 10, 20 is dependent on the required capacitance of the total cell.

Figure 2:
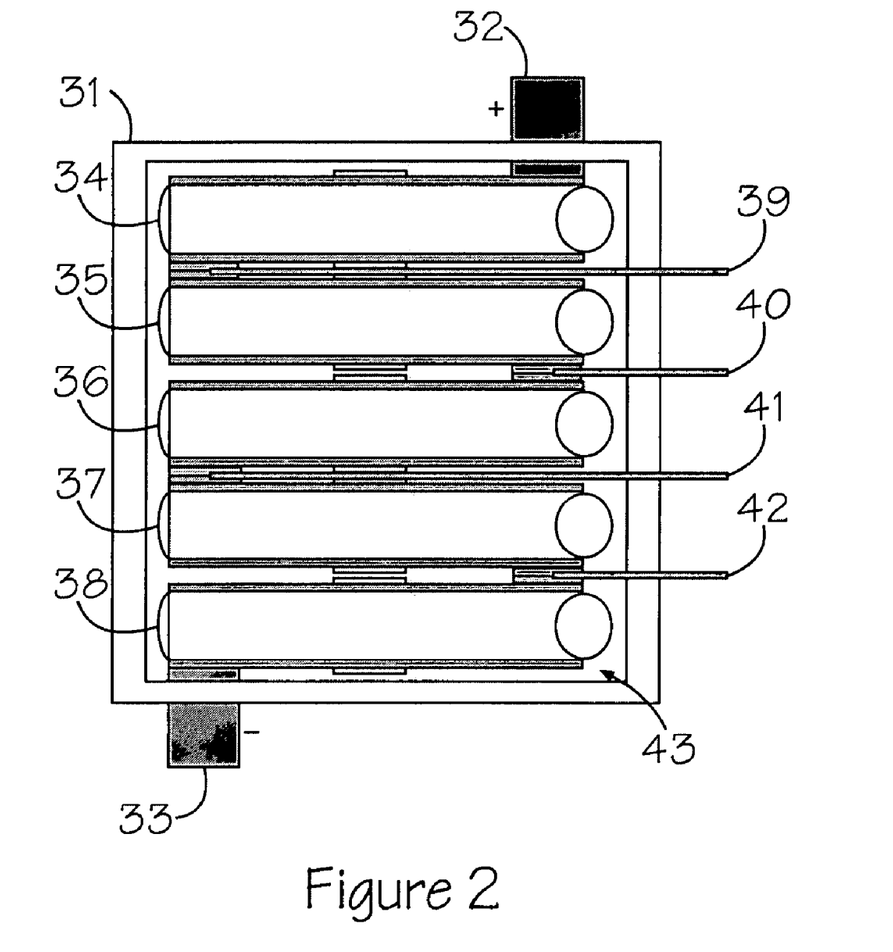
FIG. 2 is an illustration of 12-volt EDLC unit with external monitor/control leads.

Referring now to FIG. 2, there is shown a single EDLC device 10 using only one electrolyte 43, not shown, for an entire structure comprising five concatenated electrode assemblies, 34-38. The voltage monitor/control tabs 39-42 are extended external to the pouch bag 31. The power tabs 32, 33 and voltage control\monitor tabs 39-42 provide the complete electrical interface. FIG. 2 shows a complete 12-volt EDLC in a poly bag package.

Using an electrolyte with 1.0 M of $TEABF_4$ in Acetonitrile limits the voltage to 2.7 volts. This now becomes the determining factor for the total number of electrode assemblies required for the entire stack 30. For example, a 12-volt cell requires five assemblies, as shown. The current collector interface tabs between electrode assemblies are sonically welded 32 to minimize electrical lead resistance.

It is difficult to manufacture individual electrodes to contain the exact amount of capacitance so that all assemblies in the stack are identical. It is for this reason monitor/control terminal tabs 39-42 are available externally.

Poly bag 31 is constructed with multiple layers, not shown. Poly bag 31 provides a lightweight, puncture resistant, airtight seal having a long service factor and being chemically indifferent to the electrolyte used within this embodiment. Poly bag 31 also has a small form factor since all gas can be replaced with nitrogen, then purged and supplemented with electrolyte to form a vacuum tight seal. The sealant material is a linear, low-density polyethylene that reforms below 120° C. A low-density polyethylene layer is then applied and used as a tie layer. Tie layers are very thin layers binding and holding two different materials together. Copper is used as the chemically non-reactive foil layer to moisture-proof the assembly. The copper is sandwiched between another low-density polyethylene tie layer. The outermost, puncture resistant material is a layer of polyethylene terephthalate.

A specific voltage standoff EDLC need not necessarily have individual electrode assemblies separately made and connected by welding, such as shown in the preferred embodiment (FIG. 2). The two electrodes required for each electrode assembly encompassed into a single cell EDLC can be manufactured to accommodate separate activated carbon partitions, this being the individual electrode assemblies in series on the current collector capacitor grade aluminum.

Figure 3:
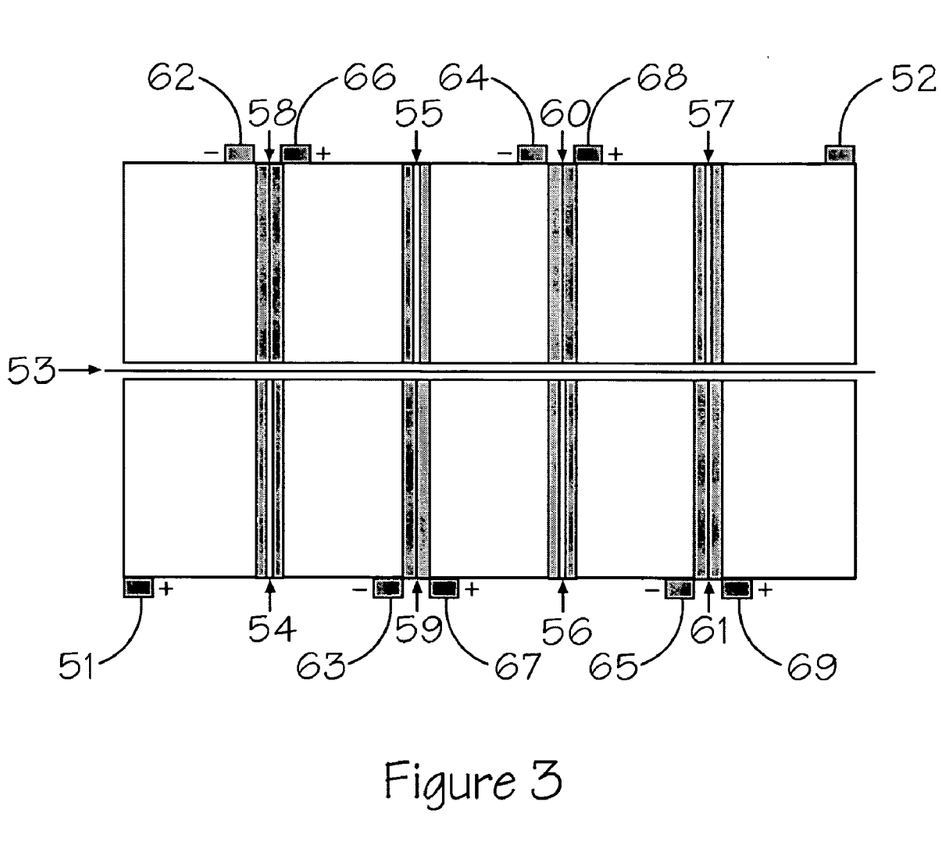
FIG. 3 is an illustration of the front side, top and bottom side of two electrodes specifically manufactured for an integrated assembly of a 12 volt stacked arrangement.
Figure 4:
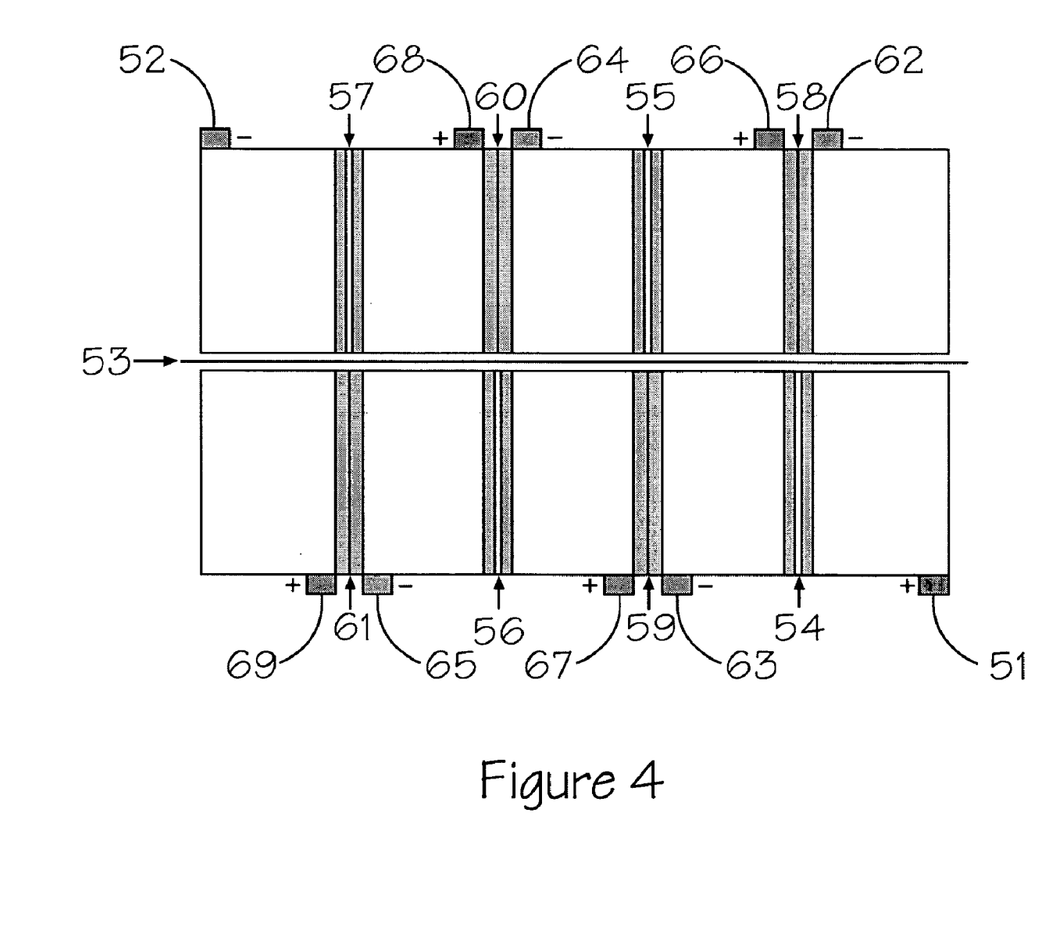
FIG. 4 is an illustration of the backside, top and bottom side of two electrodes specifically manufactured for an integrated assembly of a 12 volt stacked arrangement.
Figure 5:
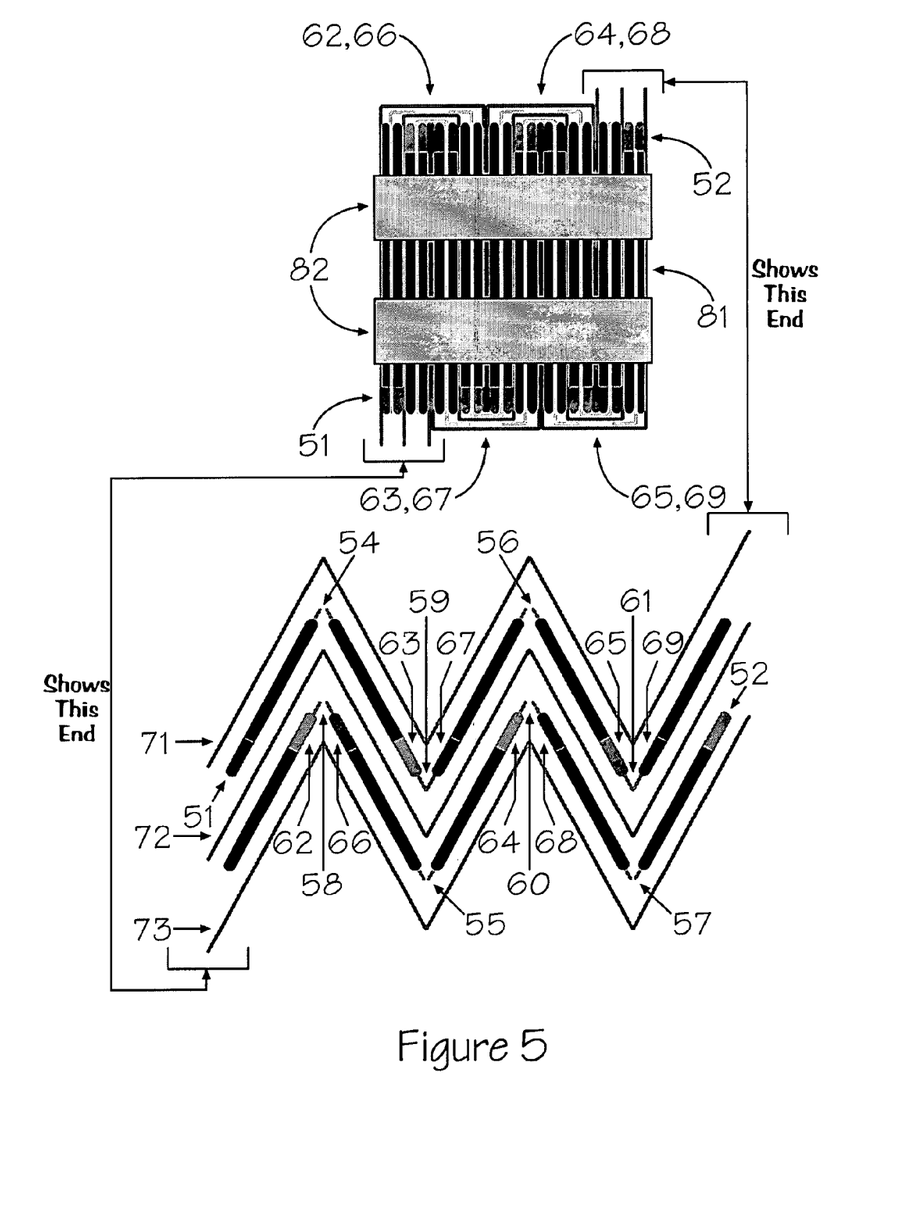
FIG. 5 is an illustration of a complete 12 volt series electrode assembly showing power and monitor/control voltage taps incorporated into the folding scheme.

FIG. 3 illustrates the front, top and bottom views of two electrodes on one side of a complete EDLC unit, FIG. 5, whereas FIG. 4 illustrates the backside, top and bottom views thereof. A fold line 53 (FIG. 3) indicates where the top and bottom portions of the electrode arrangement are folded. Similarly, in FIG. 4, folded line 53 indicates the location at which the top and bottom electrodes 50a are folded and overlap.

The 12-volt manufactured electrode of FIGS. 3 and 4 has a total of ten activated carbon pads on each side of the electrode that are carbon isolated from each other. The tabs of FIGS. 3 and 4 can be color coded to indicate the specific voltage polarity segments. FIGS. 3 and 4 show both the front and back of the device, activated carbon pads segmented areas being imprinted onto two aluminum current collectors of which a two-electrode structure can be configured for a 12-volt stack. Other electrode arrangements can also be configured for larger and smaller voltage stack arrangements as desired.

The capacitance of each pad and its arrangement on the current collector determines the total cell capacitance. The activated carbon mix has a specific capacitance associated with its inherent physical properties, such as pore size and pore size distribution. The carbon loading and specific capacitance yields the desired capacitance in farads per cubic centimeter, $F/cm^3$. Since the application voltage standoff dictates the volumetric pad size, the volume of the pad must be calculated, L×W×H. An individual pad is designed and duplicated to populate the entire current collector interface.

Referring to FIGS. 3 and 4, pad areas of the carbon composite on the current collector must be identified to ensure voltage isolation between the individual electrode terminals. Areas 54-57 are clean cut or foil free relative the rest of the assembly.

Figure 6:
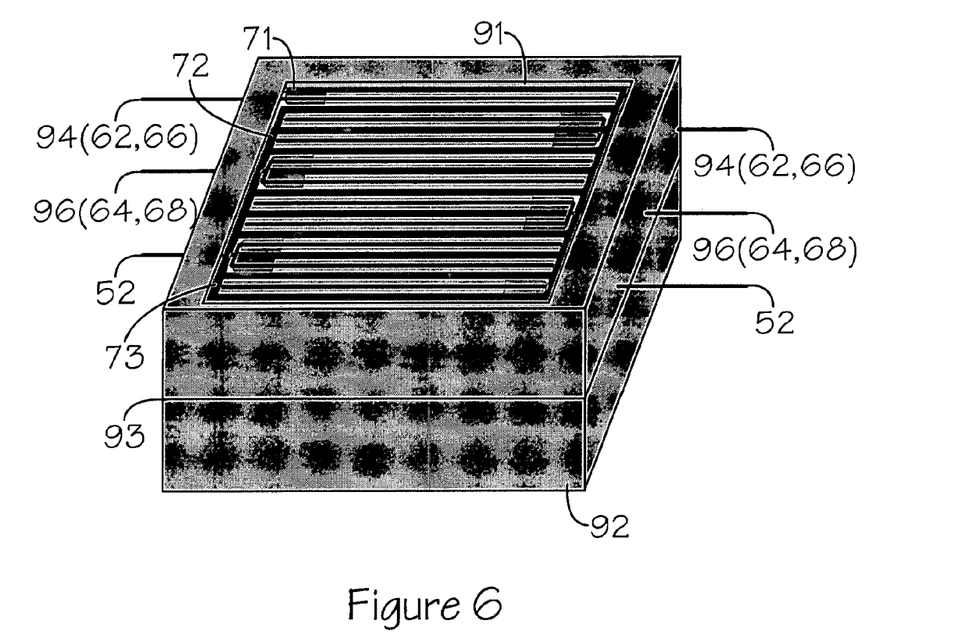
FIG. 6 is an illustration of a completed single cell series connected 12-volt device packaged within a poly bag container with power and monitor/control lead extensions.

Referring now to FIGS. 5 and 6, the single electrode aluminum current collector structure as depicted in FIGS. 3 and 4 is first made by layering a thin coating of specially formulated activated carbons and binder combination, not shown, onto an aluminum current collector. The capacitance is designed into electrodes 50, 50a by the physical area of carbon applied, L×W×H. Mass-free zones 58-61 are carbonless and are used as the folding points, along with the clean cut areas 54-57 for the series electrode voltage stages. Two separate and physically different electrodes are provided, one being the positive and one being a negative electrode. The unique folding scheme creates five segments in series for a single cell double layer capacitor. Since each electrode has carbon composites on both sides, the bipolar carbon composite layout for each electrode (FIG. 3) matches the alternate electrical pole (FIG. 4) precisely.

The material for poly bag 92 (FIG. 6) is cut into the desired shape of the electrode assembly 81 with provisions made for extension of the poly bag material to extend beyond the electrode assembly edge, providing a better seal around the tabbed leads 94 (62,66), 95 (63,67), 96 (64,68), and 97 (65, 69). The total number of extensions in the 12 volt assembly 80 protruding to the outside of the poly bag 92 includes power 71 and ground 52 with four tabs 94-97 for the individual connections to the series stack. The individual series cell aluminum tabs are sonically welded to copper or aluminum flat stock materials, which are brought out through the poly bag 92.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. An electrochemical double layer capacitor (EDLC) comprising:
   an electrode including:
      a first electrode segment;
      a second electrode segment; and
      a mass-free zone separating said first electrode segment from said second electrode segment;
   an electrolyte; and
   a housing for containing said electrolyte, said first electrode, and said second electrode.

2. The EDLC in accordance with claim 1, further comprising a power tab operatively connected to said electrode.

3. The EDLC in accordance with claim 1, wherein said housing provides an external interface for said electrode.

4. The EDLC in accordance with claim 1, wherein said electrode comprises a double-sided activated carbon electrode formed on a current collector.

5. The EDLC in accordance with claim 1, wherein said first electrode segment is folded relative to said second electrode segment so that said mass free zone is disposed at the apex of said fold.

6. The EDLC in accordance with claim 1, wherein said housing is shaped to conform to said EDLC.

7. The EDLC in accordance with claim 1, wherein said housing comprises a one cell structure having one electrolyte source for accommodating a plurality of variant voltage stacks, thereby yielding a variant of different terminal voltage limits.

8. The EDLC of claim 1, wherein the housing is a poly bag.

9. An electrochemical double layer capacitor (EDLC) comprising:
   a first electrode assembly, the first electrode assembly being a first double-sided activated carbon electrode;
   a second electrode assembly, the second electrode assembly being a second double-sided activated carbon electrode, the second electrode assembly electrically connected in series with the first electrode assembly;
   a mass-free zone disposed between the first electrode assembly and the second electrode assembly; and
   a poly bag for containing said first electrode assembly and said second electrode assembly.

10. The EDLC in accordance with claim 9, further comprising a power tab operatively connected to said first electrode assembly.

11. The EDLC in accordance with claim 9, wherein said poly bag provides an external interface for said first electrode assembly.

12. The EDLC in accordance with claim 9, wherein each of said first electrode assembly and said second electrode assembly being formed on a current collector.

13. The EDLC in accordance with claim 9, wherein said first electrode assembly is folded relative to said second electrode assembly so that said mass free zone is disposed at an apex of said fold.

14. The EDLC in accordance with claim 9, wherein said poly bag is shaped to conform to said EDLC.

15. The EDLC in accordance with claim 9, wherein said poly bag is a one cell structure containing one electrolyte source which can accommodate a multitude of variant voltage stacks thereby yielding a variant of different terminal voltage limits.

16. An electrochemical double layer capacitor (EDLC) comprising:
   a first electrode including:
      a first electrode segment having a first polarity;
      a second electrode segment having a second polarity; and
      the first electrode segment being carbon isolated from the second electrode segment; and
   a second electrode including:
      a third electrode segment having the first polarity;
      a fourth electrode segment having the second polarity; and
      the third electrode segment being carbon isolated from the fourth electrode segment.

17. The EDLC of claim 16, wherein the second electrode is disposed on the first electrode such that the third electrode segment is disposed on the first electrode segment and the fourth electrode segment is disposed on the second electrode segment.

18. The EDLC of claim 16, further comprising a power lead, wherein the first electrode, the second electrode, and the power lead are folded such that (1) the first electrode segment is disposed opposite the fourth electrode segment; and (2) a portion of the power lead is disposed between the first electrode segment and the fourth electrode segment.

19. The EDLC of claim 16, the first electrode further comprising:
   a fifth electrode segment having the second polarity;
   a sixth electrode segment having the first polarity; and
   the first electrode and the second electrode folded such that (1) the third electrode segment is disposed between the first electrode segment and fifth electrode segment; and (2) the fourth electrode segment is disposed between the second electrode segment and sixth electrode segment.

20. The EDLC of claim 16, wherein the first electrode segment is folded relative to said second electrode segment such that the first electrode segment is carbon isolated from said second electrode segment at an apex of the fold.

* * * * *